Oct. 26, 1965     E. BREETVELT     3,213,732

PLATE SHEARING MACHINES

Filed Aug. 28, 1963

United States Patent Office 3,213,732
Patented Oct. 26, 1965

3,213,732
PLATE SHEARING MACHINES
Emile Breetvelt, 17 Queens Road, Parktown, Johannesburg, Transvaal, Republic of South Africa
Filed Aug. 28, 1963, Ser. No. 305,110
Claims priority, application Republic of South Africa,
Sept. 6, 1962, 924/62; July 9, 1963, 3,070/63
6 Claims. (Cl. 83—196)

This invention relates to machines for shearing sheets particularly metal plates.

Generally the simplest way of cutting or severing material is to use a pair of shears or scissors. A similar shearing action takes place in a number of machines for cutting sheets of metal and the like. When however a machine cuts a metal sheet by passing it between blades which are adapted to be rotated relative to one another and about the center of their lengths the cut would take place simultaneously from either end but the center portion in the length of the plate would not be severed.

The object of this invention is to provide a shearing machine for sheets in which the shearing blades are pivoted together centrally of their length to cut with a scissors-like action at both ends simultaneously and in which provision is made subsequently for severing the central portion of the cut plate.

In accordance with this invention a machine for shearing sheets comprises a pair of flat beams pivoted together to rotate flat against each other about a pivot, a slot passing through both beams, the pivot being located on a line normal to the slot and central of its length, shearing blades in the flat face of each beam and forming on opposite sides the inner edges of the slot in each beam, and means providing additional movement of one beam to move its shear blade across the width of the slot.

Further features of the invention provide for the blades to be moved to restrict the width of the slot; also for the blades at points remote from their center to have a shallow concave shape.

Figure 1:
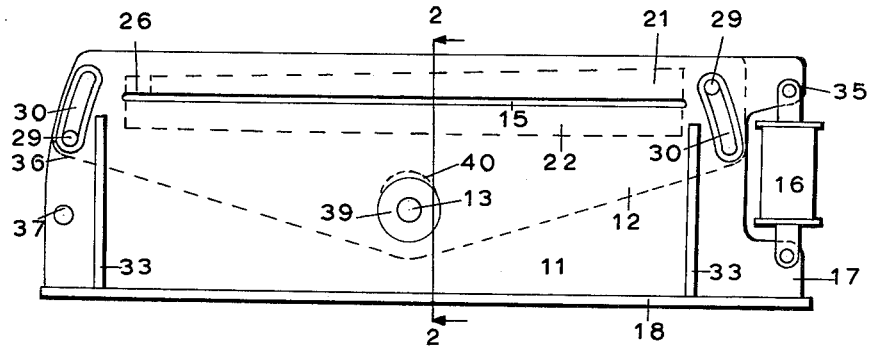
Figures 2, 4:
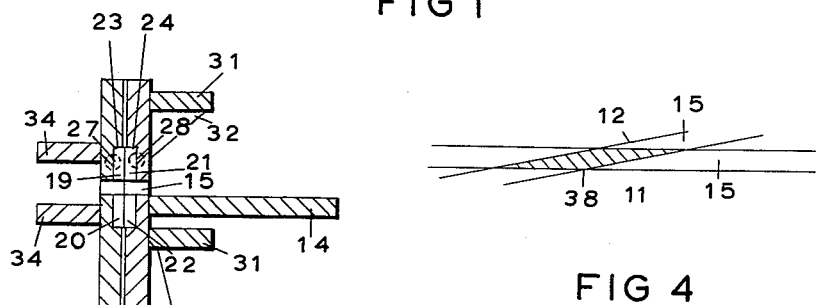
Figure 5:
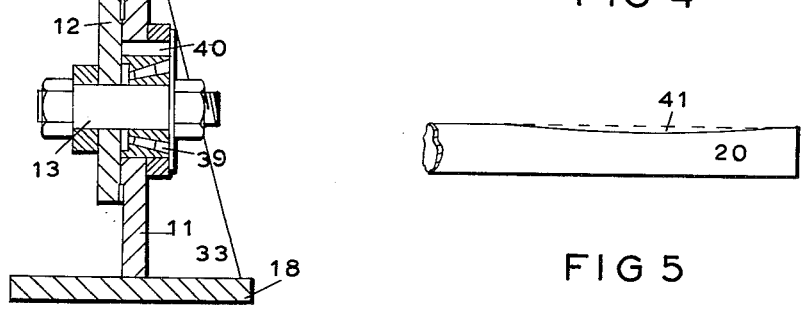
Figure 3:
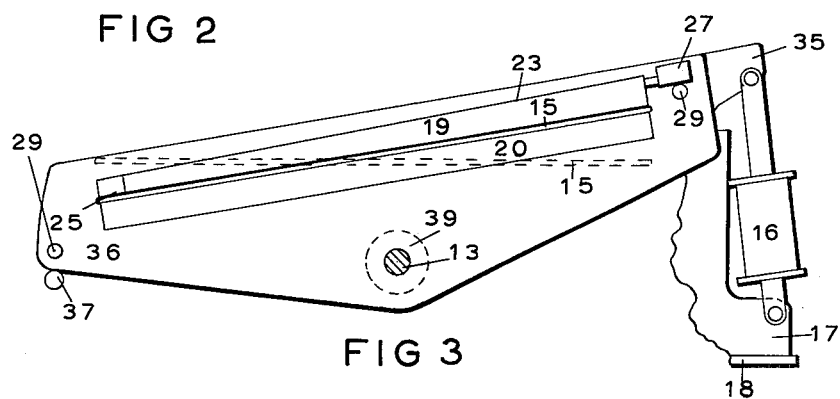

The invention is illustrated in the accompanying drawings in which:

FIG. 1 is a front elevation view of the machine,
FIG. 2 is a cross-section taken on the line 2—2 of FIG. 1, and drawn on a larger scale,
FIG. 3 is a diagrammatic view showing the movement of the movable beam,
FIG. 4 shows the center portion of a plate awaiting shearing, and
FIG. 5 illustrates a modification in the shape of the shearing blades.

The shearing machine shown consists of two beams 11, 12 which are flat and held together with a pivot 13. The machine may be operated in any position, the plates to be cut being fed to it vertically or horizontally. As shown, however, the machine is adapted to operate in an upright position. The beam 11 is the stationary one and has a table 14 (FIG. 2) for the support of the plate to be cut and to be fed horizontally.

The table 14 omitted in FIG. 1 is secured to beam 11 and is fixed in line with the lower edge of the slot 15 through which the plate to be cut is passed.

The beam 12 is adapted to be rotated about the pivot 13 which is fixed in beam 12 and rotates in a bearing in beam 11. To effect rotation in the shearing machine illustrated, there is provided a hydraulic jack 16. As shown the foot 17 of said jack 16 is secured to the base 18 and the expansion of the jack 16 tilts the beam 12 upwardly to rotate it about pivot 13.

For convenience of description it is assumed that the shearing blades extend the full length of the slot 15 and in each beam 11 and 12 there will be a shear blade top and bottom of the slot 15, making four blades in all. The blades in the movable beam 12 are numbered 19 on top and 20 below the slot 15 and in the fixed beam 11 the shear blades are numbered 21 on top and 22 below the slot 15.

The shear blades 19 and 21 above the slot 15 are tapered longitudinally and are housed in tapered recesses 23, 24 with a clearance space at their ends 25 and 26. With this mounting, if the blades 19 and 21 are pushed towards the left they will move down in their recesses 23, 24 to project into the slot 15. If there is a plate, not shown, to be cut resting in the slot 15 and blades 19 and 21 can be lowered until they rest on the plate to be cut and act as a "hold-down" during the cutting operation. The blades 19 and 21 may be moved with hydraulic jacks or rams 27 and 28.

The bolts 29 in curved slots 30 serve to keep the beams 11, 12 together during the shearing operation. The beams 11, 12 are in close sliding contact about the shear blades 19 and 21 and 20 and 22, also in areas about the pivot 13. At other points they make contact to prevent any tendency for beam 12 to rock during the movement against beam 11. In other parts there may be left a clearance between the plates to allow scale or other dirt to pass out from between them. In addition to the table 14 there are projecting rib-like members 31 secured to the stationary beam 11. Table 14 and members 31 are omitted from FIG. 1 but are shown in FIG. 2. All these members serve to stiffen the beam 11 against any flexing during the shearing operation. The gussets 32 and the larger anchoring gusset 33 act in the same way. The movable beam 12 has projecting ribs 34 to keep it rigid in the vicinity of the shearing blades.

In operating the shearing machine the plate to be cut is placed on the table 14 and slid forward into the slot 15 between the blades 19, 21 on the one side and 20, 22 on the other. The blades 19 and 21 are then moved lengthwise to the left in their recesses 23, 24 to lower them into contact with the plate to be cut. This will prevent the plate cocking up and being distorted during the cutting operation. The end 35 of beam 12 is now forced upwardly. Any suitable mechanism may be used for this purpose.

As illustrated the hydraulic jack 16 is used. The beam 12 rotates about pivot 13 and the end 36 of beam 12 descends until it comes into contact with a stop 37. The plate to be cut has now been partially severed the cut extending from both ends, but in the center above the pivot 13 a small portion of the plate somewhat in the shape of a parallelogram 38 (see FIG. 4) is left uncut. With the end 36 of the beam in contact with the stop 37 further movement of the jack 16 will act to lift the beam 12 including its bearing 39 in beam 11 about the pivot 13. Pivot 13 is secured in beam 12. A space 40 is provided above the bearing 39 as shown in FIG. 2 for the lifting to take place. There are many ways by which beam 12 may be lifted about pivot 13 to cut the part 38 but the use of the jack 16 to give an extra lift while beam 12 rests against stop 37 is a simple way of doing what is necessary.

It is obvious that with this shearing machine the beginning of a shear takes place at the right and left end simultaneously. In the initial stages this is a very long and almost flat cut and requires great power to effect the cut. To make the start of the cuts easier the pivot is located below the slot 15 and in addition the shear blades at their operative ends may have their cutting edge curved inwardly (as shown at 41 in FIG. 5) so that the cut will take place initially over a shorter length and the initial power required will be reduced.

In operating the shearing machine described at the beginning of the cut the bottom blade 20 in the moving beam 12, on the right hand side of the machine as illustrated, will, with a scissors-like action, approach upwardly the top blade 21 in the fixed beam 11. Simultaneously the top blade 19 in the moving beam 12 on the left of the machine will commence the downward cut against the blade 22 in the fixed beam 11.

The cut approaches the center of a plate in the length of the slot 15 and, without the moving beam 12 making an excessive angle across the slot 15, the angular movement of the beam 12 is stopped by contact with stop 37. With the continued action of the jack 16 the beam 12 is lifted so that its blade 22 moves across the slot 15 to sever the central portion 38 (see FIG. 4) of the plate. The space 40 above the bearing 39 about the pivot 13 in fixed beam 11 allows the required movement.

This invention provides a shearing machine for sheets which has a double scissors cutting action about a center of rotation and which is also capable of cutting through the central portion of the sheets to sever them completely.

What I claim as new and desire to secure by Letters Patent is:

1. A sheet shearing machine comprising two flat beams, a pivot secured to one of said beams, the other of the beams being provided with a recess in which the pivot is accommodated with clearance whereby said beams are pivotally movable with respect to one another, said beams being provided with alignable slots extending lengthwise of the beams and in which slots when aligned may be introduced a sheet to be cut, a pair of cutting blades in each beam respectively bounding the associated slot at the top and bottom thereof, means engaging the beams to pivotally move the said one beam with respect to the other beam which will cause the cutting blades to sever the sheet from the opposite ends thereof towards its center, and a fixed stop positioned in the path of said one beam to engage the same and limit movement thereof such that continued movement of said one beam will cause pivoting of said one beam about the fixed stop as a fulcrum as a result of the clearance of the pivot in the recess whereby the center of the sheet will be cut.

2. A sheet shearing machine as claimed in claim 1 wherein the beams are provided with blade recesses in which the blades are supported, said blades and blade recesses being tapered in depth along their length, said blades being supported in the blade recesses with longitudinal clearance such that the blades can be moved longitudinally in the blade recesses in order to project into the slots.

3. A sheet shearing machine as claimed in claim 1 comprising means for clamping one pair of blades against a sheet to be cut in the slot to form a hold down for the plate.

4. A sheet shearing machine as claimed in claim 1 comprising rib stiffeners on said beams.

5. A sheet shearing machine as claimed in claim 4 wherein one of said rib stiffeners on said other beam member is proximate the slot therein and forms a table for the sheet to be cut.

6. A sheet shearing machine comprising a pair of beams, pivot means centrally connecting the beams for relative pivotal movement about a transverse axis, each beam being provided with a transverse slot therein extending lengthwise, said slots being aligned in one relative position of the beams whereby a sheet to be cut can be introduced into the aligned slots, cutting means supported in said beams and bounding said slots to produce cuts in said sheet which extend from the ends thereof towards the center upon relative movement of the beams, and stop means positioned in the path of travel of one of the beams to limit movement thereof, said pivot means including means providing clearance in the pivotal connection between the beams to cause pivotal movement of said one beam about said stop means upon contact therewith whereby the center of the sheet will be cut by the cutting means.

References Cited by the Examiner

UNITED STATES PATENTS

| | | | |
|---|---|---|---|
| 596,530 | 1/98 | McCoy | 83—700 |
| 676,156 | 6/01 | Scharfe | 83—199 |
| 2,695,059 | 11/54 | Ernst | 83—199 |
| 3,031,033 | 4/62 | Clemons | 83—199 |
| 3,084,582 | 4/63 | Anderson | 83—699 |
| 3,090,270 | 5/63 | Rhodes et al. | 83—700 |
| 3,111,877 | 11/63 | Rugenstein | 83—699 |

WILLIAM W. DYER, JR., *Primary Examiner.*

ANDREW J. JUHASZ, *Examiner.*